US010848854B2

(12) United States Patent
Orron et al.

(10) Patent No.: US 10,848,854 B2
(45) Date of Patent: Nov. 24, 2020

(54) WEARABLE DEVICE FOR ACTIVITY MONITORING (71) Applicant: Vi Labs Ltd., Tel-Aviv (IL)

(72) Inventors: Zvi Orron, Tel-Aviv (IL); Yonathan Nativ, Tel-Aviv (IL); Jonathan Aprasoff, Kfar-Saba (IL); Omri Yoffe, Sde Warburg (IL)

(73) Assignee: Vi Labs Ltd, Tel-Aviv (IL)

( * ) Notice: Subject to any disclaimer, the term of this patent is extended or adjusted under 35 U.S.C. 154(b) by 169 days.

(21) Appl. No.: 16/090,826

(22) PCT Filed: Jun. 21, 2017

(86) PCT No.: PCT/IL2017/050690
§ 371 (c)(1),
(2) Date: Oct. 3, 2018

(87) PCT Pub. No.: WO2017/221248
PCT Pub. Date: Dec. 28, 2017

(65) Prior Publication Data
US 2019/0098397 A1 Mar. 28, 2019

Related U.S. Application Data (60) Provisional application No. 62/353,058, filed on Jun. 22, 2016.

(51) Int. Cl.
G01S 19/52 (2010.01)
H04R 1/10 (2006.01)
(Continued)

(52) U.S. Cl.
CPC ............ H04R 1/1091 (2013.01); G01S 19/52 (2013.01); H04R 1/105 (2013.01); H04R 1/1016 (2013.01);
(Continued)

(58) Field of Classification Search
CPC .. H04R 1/1091; H04R 1/1016; H04R 1/1041; H04R 1/105; H04R 5/0335; G01S 19/52;
(Continued)

(56) References Cited

U.S. PATENT DOCUMENTS

2013/0006583 A1 1/2013 Weast et al.
2013/0190599 A1* 7/2013 Wyeth ................. A61B 5/0522
600/409

(Continued)

FOREIGN PATENT DOCUMENTS

CN 203632842 6/2014
CN 105467826 4/2016
(Continued)

OTHER PUBLICATIONS

International Search Report and the Written Opinion dated Dec. 1, 2017 From the International Searching Authority Re. Application No. PCT/IL2017/050690. (20 Pages).
(Continued)

Primary Examiner — Harry K Liu (57) ABSTRACT

A system for estimating an indoor speed of an individual is provided. The system includes a motion sensor attachable to an upper body of the individual and at least one processor being in communication with the motion sensor. The processor is configured for periodically prompting the user to provide a speed value or instructing the user to run/walk at a specific speed value, extracting features from data collected by the motion sensor that correspond to the speed value and calculating a speed of the individual from a probabilistic model.

11 Claims, 12 Drawing Sheets

Estimation Phase:

(51) Int. Cl.
*H04R 5/033* (2006.01)
*G01S 19/49* (2010.01)

(52) U.S. Cl.
CPC ......... *H04R 1/1041* (2013.01); *H04R 5/0335* (2013.01); *G01S 19/49* (2013.01); *H04R 1/1033* (2013.01); *H04R 2201/103* (2013.01); *H04R 2420/07* (2013.01)

(58) Field of Classification Search
CPC .......... G01S 19/37; G01S 19/39; G01S 19/42; G01S 5/0009
USPC ................................................... 342/357.35
See application file for complete search history.

(56) References Cited

U.S. PATENT DOCUMENTS

| | | | |
|---|---|---|---|
| 2013/0256345 A1 | 10/2013 | Larkin | |
| 2015/0181325 A1 | 6/2015 | Urup et al. | |
| 2015/0181326 A1 | 6/2015 | Prest et al. | |
| 2016/0094899 A1* | 3/2016 | Aumer | H04Q 9/00 340/870.07 |
| 2016/0107066 A1 | 4/2016 | Lee et al. | |
| 2016/0349509 A1* | 12/2016 | Lanier | G06F 3/011 |
| 2017/0034625 A1* | 2/2017 | Wick | H04R 7/02 |
| 2018/0020979 A1* | 1/2018 | Wagner | A61B 5/0013 600/379 |

FOREIGN PATENT DOCUMENTS

| | | |
|---|---|---|
| CN | 105521595 | 4/2016 |
| WO | WO 2015/092533 | 6/2015 |
| WO | WO 2017/055792 | 4/2017 |
| WO | WO 2017/221248 | 12/2017 |

OTHER PUBLICATIONS

Invitation to Pay Additional Fees dated Sep. 13, 2017 From the International Searching Authority Re. Application No. PCT/IL2017/050690. (2 Pages).
LG "LG Tone Wireless Bluethooth Stereo Headset—Retail Packaging—Black/Orange", LG, Product Sheet, 6 P., Feb. 1, 2015.
International Preliminary Report on Patentability dated Jan. 3, 2019 From the International Bureau of WIPO Re. Application No. PCT/IL2017/050690. (10 Pages).
Notification of Office Action and Search Report dated Jun. 18, 2020 From the State Intellectual Property Office of the People's Republic of China Re. Application No. 201780035861.5. (9 Pages).
Translation Dated Jul. 21, 2020 of Notification of Office Action dated Jun. 18, 2020 From the State intellectual Property Office of the People's Republic of China Re. Application No. 201780035861.5. (6 Pages).

* cited by examiner

Estimation Phase:

FIG. 4A

Training Phase:

WEARABLE DEVICE FOR ACTIVITY MONITORING

RELATED APPLICATIONS

This application is a National Phase of PCT Patent Application No. PCT/IL2017/050690 having International filing date of Jun. 21, 2017, which claims the benefit of priority under 35 USC § 119(e) of U.S. Provisional Patent Application No. 62/353,058, filed on Jun. 22, 2016. The contents of the above applications are all incorporated by reference as if fully set forth herein in their entirety.

FIELD AND BACKGROUND OF THE INVENTION

The present invention relates to a wearable device for monitoring an activity of an individual. Embodiments of the present invention relate to a headset capable of estimating an indoor speed of an individual and configurations thereof utilizing a unique neck collar-type design.

Wearable sensors can be used to monitor an individual and derive information relating to physiological parameters such as heart rate, blood oxygen saturation, body temperature, hydration state, blood pressure and the like, environmental information such ambient temperature, relative humidity or UV intensity etc and activity related information such as running/walking speed, elevation, gradient etc. Information collected from wearable sensors can be used by smartphone apps or wearable devices (e.g. Smart Watches, headsets) to a help a user achieve goals such as staying fit or healthy, being active, losing weight or managing chronic disease.

One activity-related parameter essential to walkers or runners is speed and distance. Outdoor speed can be easily obtained via a global positioning system (GPS) receiver however, such a sensor cannot provide reliable indoor speed or outdoor speed under over cast conditions (cloud or structure cover), since in order to obtain a lock on a signal, a GPS receiver must have an unobstructed line of sight to the satellite. Indoor running is typically performed on a treadmill where speed can be preset. Since a treadmill does not typically communicate with wearable devices, a run is not recorded on the user's device.

While indoor speed can be estimated from pedometers (stride sensors) such as the Nike+ shoe sensor, such sensors have to be positioned remotely from the wearable device (e.g. watch or smartphone) and require the user to wear and operate another device. Although pedometers can be calibrated outdoors against GPS data, treadmill running dynamics differ from outdoor running dynamics and as such outdoor calibration can be inaccurate.

There is thus a widely recognized need for, and it would be highly advantageous to have, a wearable device capable of providing reliable indoor speed data to an individual without having to utilize a dedicated sensor positionable remotely from the device.

SUMMARY OF THE INVENTION

According to one aspect of the present invention there is provided a headset comprising: (a) a pair of earbuds; and (b) a substantially U-shaped neck collar wired to the earbuds, the neck collar including an elastic element being configured for: (i) applying a force biasing the arms inward to thereby stabilize the neck collar on a neck of a user; and (ii) enabling folding of the neck collar into a folded configuration with the arms crossing each other and a bridge connecting the arms forming at least one complete loop.

According to further features in preferred embodiments of the invention described below, the headset further comprising at least one chipset for audio processing and wireless communication.

According to still further features in the described preferred embodiments the headset further comprising a power supply.

According to still further features in the described preferred embodiments the at least one chipset is positioned within the neck collar and/or the earbuds.

According to still further features in the described preferred embodiments the earbuds are attachable to the neck collar.

According to still further features in the described preferred embodiments the earbuds are magnetically attachable to the neck collar.

According to still further features in the described preferred embodiments the elastic element is a tempered high-carbon steel or Nitinol wire.

According to still further features in the described preferred embodiments the folded configuration is stabilized via interlinking of the arms at a cross over region.

According to still further features in the described preferred embodiments the interlinking is effected via a magnetic force.

According to still further features in the described preferred embodiments the neck collar is wrapped by silicone.

According to still further features in the described preferred embodiments the headset further comprising at least one physiological sensor positioned on or in an earbud of the pair of earbuds.

According to another aspect of the present invention there is provided a system for estimating an indoor speed of an individual comprising: (a) a motion sensor attachable to an upper body of the individual; (b) at least one processor being in communication with the motion sensor, the processor being configured for: (i) periodically prompting the user to provide a speed value or instructing the user to run/walk at a specific speed value; (ii) extracting features from data collected by the motion sensor that correspond to the speed value; and (iii) calculating a speed of the individual from a probabilistic model constructed from (i) and (ii).

According to still further features in the described preferred embodiments the motion sensor is an accelerometer.

According to still further features in the described preferred embodiments the motion sensor is integrated into an earbud of a headset.

According to still further features in the described preferred embodiments the processor is integrated into an earbud or neck collar of the headset.

According to still further features in the described preferred embodiments the system includes two processors, a first processor for providing (ii) and a second processor for providing (iii).

According to still further features in the described preferred embodiments the second processor is remote from the motion sensor and communicates therewith via wireless communication.

According to still further features in the described preferred embodiments the motion sensor is integrated into an earbud or neck collar of a headset and the second processor is part of a cloud server.

According to still further features in the described preferred embodiments the probabilistic model is constructed from classification or regression analysis.

According to still further features in the described preferred embodiments the features extracted from the data collected by the motion sensor are acceleration feature and/or rotation motion.

According to still further features in the described preferred embodiments the processor is configured for automatically detecting when the individual is indoors.

According to still further features in the described preferred embodiments the processor classifies (iii) with respect to a GPS-determined speed when the individual is outdoors.

According to still further features in the described preferred embodiments the model takes into account biometrics of the individual.

The present invention successfully addresses the shortcomings of the presently known configurations by providing a wearable device which can be used to estimate an indoor running/walking speed and distance without having to rely on a separate pedometer-type sensor.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. In case of conflict, the patent specification, including definitions, will control. In addition, the materials, methods, and examples are illustrative only and not intended to be limiting.

Implementation of the method and system of the present invention involves performing or completing selected tasks or steps manually, automatically, or a combination thereof. Moreover, according to actual instrumentation and equipment of preferred embodiments of the method and system of the present invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

BRIEF DESCRIPTION OF THE SEVERAL VIEWS OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIGS. 1A-C schematically illustrate a neck-collar embodiment of the headset of the present invention shown in open (FIG. 1A) and folded (FIG. 1B) configurations.

DESCRIPTION OF THE PREFERRED EMBODIMENTS

The present invention is of an activity monitoring device which can be used to provide indoor walking/running speed and distance data to a user. The present invention also encompasses a headset type device which utilize a neck-collar configuration.

The principles and operation of the present invention may be better understood with reference to the drawings and accompanying descriptions.

Before explaining at least one embodiment of the invention in detail, it is to be understood that the invention is not limited in its application to the details set forth in the following description or exemplified by the Examples. The invention is capable of other embodiments or of being practiced or carried out in various ways. Also, it is to be understood that the phraseology and terminology employed herein is for the purpose of description and should not be regarded as limiting.

While GPS devices can provide outdoor speed and distance information to a user, such devices are unreliable under conditions that interfere with communication between the GPS device and orbiting satellites (e.g. indoor conditions).

In order to traverse such limitations of GPS devices, sporting goods manufacturers have devised speed/distance sensors that count the user's steps in order to provide indoor tracking of an activity such as running.

Such sensors, termed pedometers, measure and record the distance and pace of a walk or run by monitoring acceleration of the foot or leg of a user.

In order to traverse these limitations of pedometers and provide reliable indoor speed and distance data from a sensor integrated with a wearable device such as a headset or cap, the present inventors experimented with several upper body sensor placement regions in order to correlate upper body movement patterns with running/walking speed.

As is further described in the Examples section, the present inventors uncovered that it is possible to correlate speed and distance with features extracted from data collected by a motion sensor such as an accelerometer mounted on a head of a user. By using probabilistic modeling, the present inventors were able to model the speed of an individual based on such features and optionally biometric data of the individual in order to provide reliable speed data from a motion sensor mounted within a wearable device such as a headset.

A wearable device with integrated indoor speed sensor provides numerous benefits over pedometer sensors, including:

(i) the sensor is integrated into the wearable device and thus does not need to be separately carried, powered or operated;

(ii) the sensor has access to GPS data, thus enabling continuous adaptation to varying parameters; and (iii) the data from the sensor is locally integrated with data from other sensors.

Thus, according to one aspect of the present invention there is provided a system for estimating an indoor speed and distance of an individual. As is further described hereinunder, the present system can be configured as a wearable device worn on an upper body of an individual (above the waist). Examples of such wearable devices include an audio headset, a sports watch, a smart watch, a smart helmet, a smart cap, smart glasses, an arm band, a chest strap and the like.

The system of the present invention includes a motion sensor attachable to an upper body of the individual. Such a motion sensor can be an accelerometer (e.g. Analog Devices ADXL435, Invensense MPU6050, Analog Devices ADXL335). Combinations of such sensors can also be used by the present system.

The present system also includes at least one processor (STMicroelectronics STM32L151RBH) for collecting data from the motion sensor, extracting features therefrom and deriving speed values based on a probabilistic model constructed by correlating motion data features to known speed values.

The model can be constructed by collecting data from numerous individuals and/or constructed or calibrated per individual. In any case, in order to correlate specific motion data features to a specific speed, the present system can either prompt a user to run/walk at the specific speed, or the user can provide the speed value to the present system using audible or textual input.

The model is constructed by processing accelerometer data using several processing modules (each executing a unique algorithm).

A MEMS accelerometer is positioned at a head region of an individual (e.g. integrated into an earbud of a headset) and an ARM processor (integrated into headset) is used to collect acceleration data from the MEMS at 100 Hz sampling rate.

The raw acceleration data is communicated to an activity detection module which looks for acceleration patterns that correspond to locomotion (walking/running). Detection of locomotion is based on an existence of acceleration energy in typical cadence frequency.

Once activity is detected, a pre-processing module performs high pass filtering and rotates the 3 axes acceleration signal into its Principal Component Axis. A feature extraction module calculates the instantaneous features out of the last several (e.g. 5) seconds of the acceleration data. The features calculated include first second and third moments of the acceleration signal, total acceleration energy, strongest frequency apparent in the acceleration (cadence), strongest frequency energy level, peak to peak ratio, first peak to second peak distance and ratio. These features are communicated to a machine learning module along with their cross products and higher powers (second and third power).

The Machine Learning (ML) module receives the instantaneous features and the actual current user speed (e.g. communicated by the user or from GPS data). The module saves the data for a period of 2 minutes for each user running speed, over 4 typical user running speeds. The module searches for the best coefficients in the minimum mean square error sense that match the user speed using the given features. During an indoor run the estimation module uses the pre-calculated coefficients to predict the current user speed from the instantaneous calculated features.

The process of constructing the model and estimating the user's speed is further described hereinbelow with reference to FIGS. 4A-B.

Although the above described model can be constructed from data obtained from a plurality of users, running/walking technique varies from one person to the next due to differences in height, mass and experience. Thus, in order to obtain the best matching, the model is constructed and/or calibrated per user.

The motion sensor and processor of the present system can be housed in a single unit designed to be worn on the body or head of the user. As is mentioned hereinabove, such a wearable device can be a headset, watch, helmet, cap or the like.

Such devices can include additional sensors and features. For example, a headset-type device can include audio features.

The headset can be wired to an audio or data port of a mobile device (e.g. media player such as an MP3 player or a smartphone) or it can wirelessly connect thereto via BlueTooth or the like. Alternatively, the headset can be a standalone device capable of playing internally stored or cloud sourced audio content.

The headset can include one or more earbuds including speakers such as Chia-Ping CEHR-057NWG or CE-0B-098NTDWG, wireless chips (e.g. for BlueTooth, WiFi, and/or cellular communication), analog signal-conditioning elements, capacitance based touch sensors, LEDs, a power source and a vibration engine.

The earbuds can include a stabilizing element configured for contacting a posterior-inferior wall of a cavum or incisura of the ear when the earbud is positioned in the ear with the speaker directed into the ear canal.

The present system can further include an optical sensor positioned on, for example, a housing of a wearable device. In the case of a headset configuration of the present system, such a sensor can be positioned on or in a housing of an earbud at a region that contacts a surface of a tragus when the earbud is positioned in an ear with the speaker directed into an ear canal.

The optical sensor can be a photoplethysmography (PPG) sensor having at least one photodiode for generating light at a wavelength of 530 nm and at least one photodetector for detecting light reflected from the tissue. The sensor can also include at least one photodiode for emitting infra-red light at a wavelength of 880 nm. The sensor can further include an analog front end element for signal conditioning and amplification. The sensor can also include an analog-to-digital sampling element for recording the signals. The sensor can further include a digital interface allowing a micro-controller to read the recorded signals and configure the sensor's parameters.

Additional sensors that can be integrated into the present system include, but are not limited to, a barometer, a proximity sensor (to identify when the device is worn), a gyroscope, a magnetometer and a relative-humidity sensor.

As is mentioned hereinabove, the present system can include more than one processing unit. While data collection, speed value setting (via prompts or user provided) and data processing can be handled by a single processing unit integrated into a wearable device, a cloud processing unit communicating with the wearable device can be used to store user data and track model parameters over time to compensate for user change in running dynamics or to correct model based on user input, e.g. if a total tracked distance is 10.5 Km and a user inputs a 10 Km distance, the cloud processor can use this information to correct the model.

The present system can be partially or fully incorporated into a wearable device configured for monitoring an individual and providing activity and physiological information thereto.

Figure 1A:
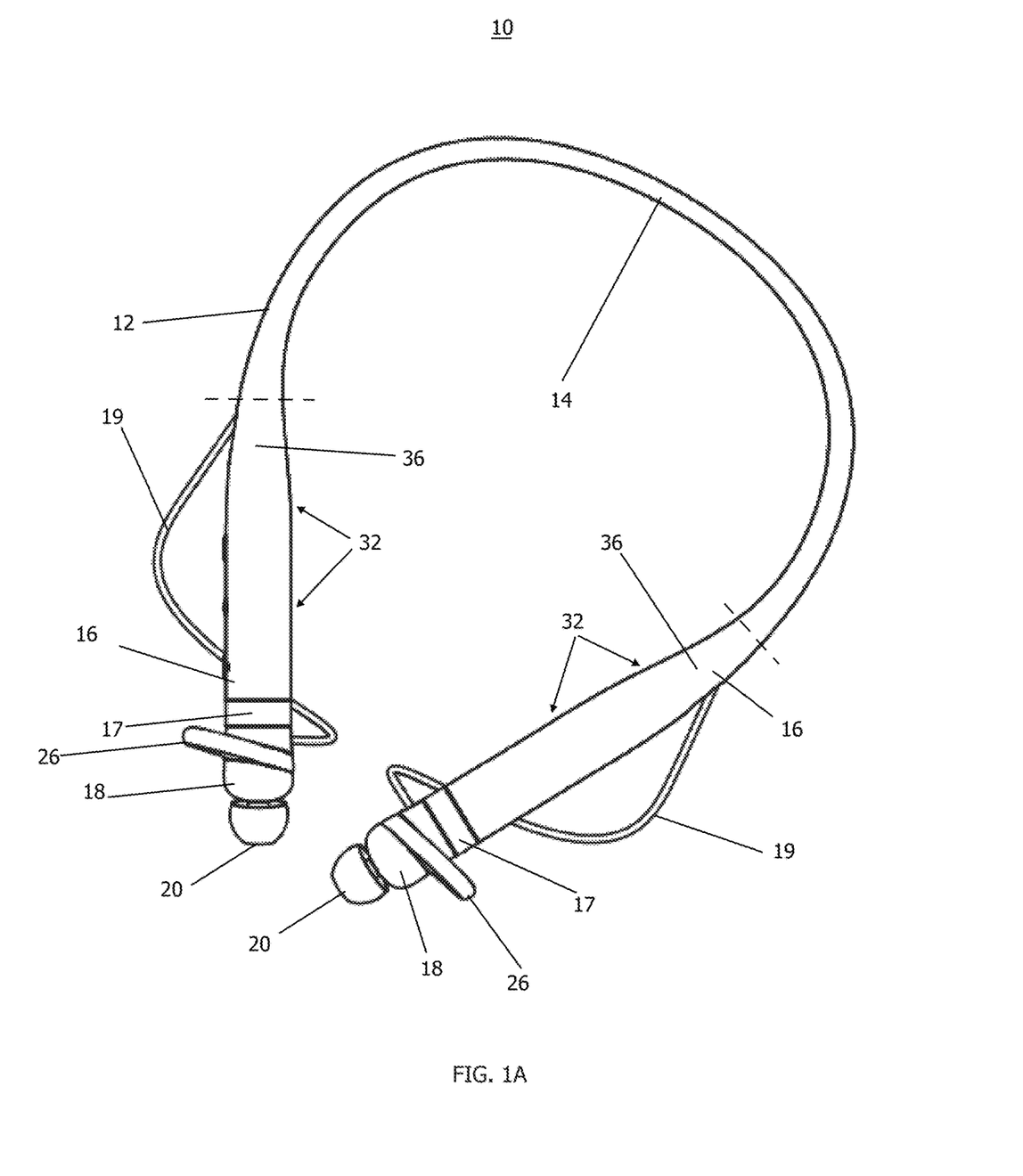
Figure 1B:
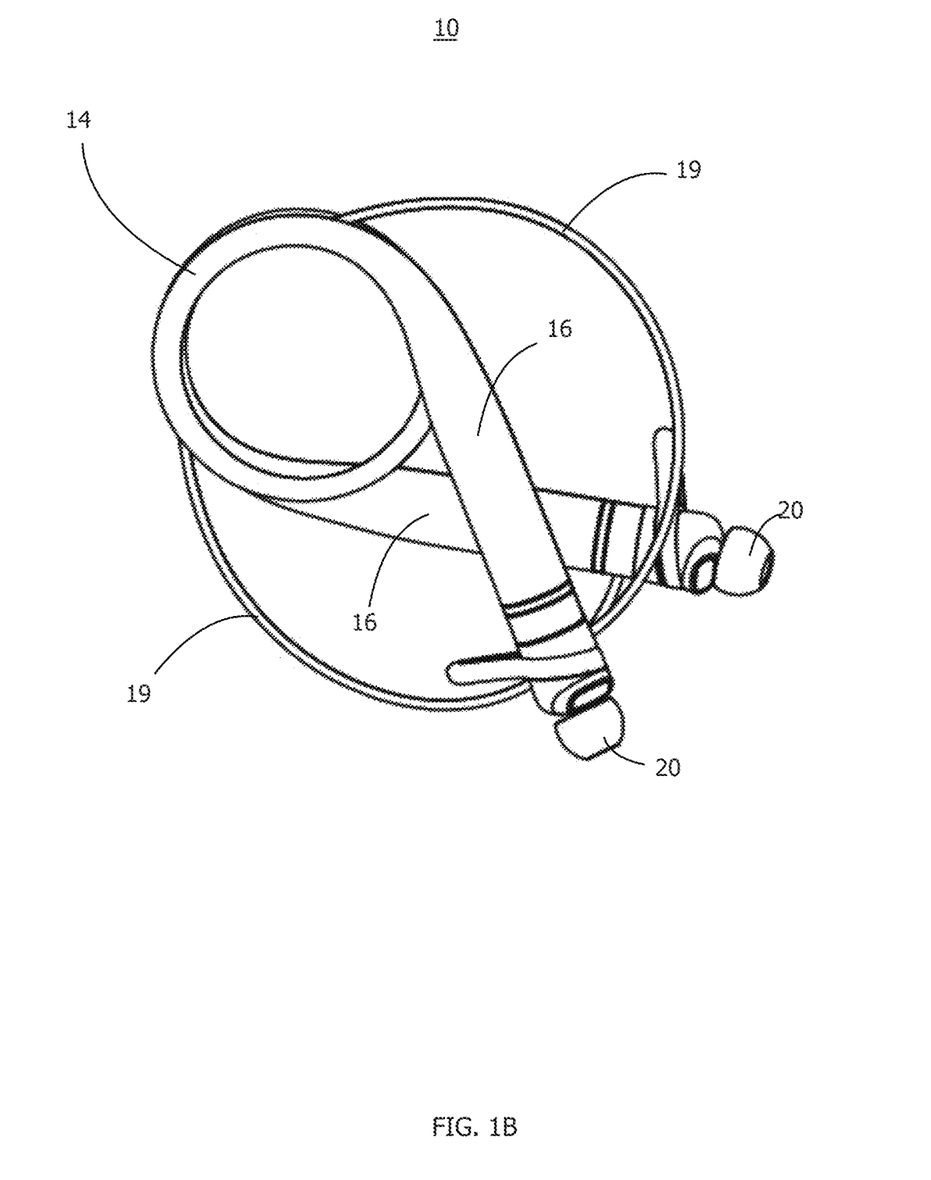
Figure 1C:
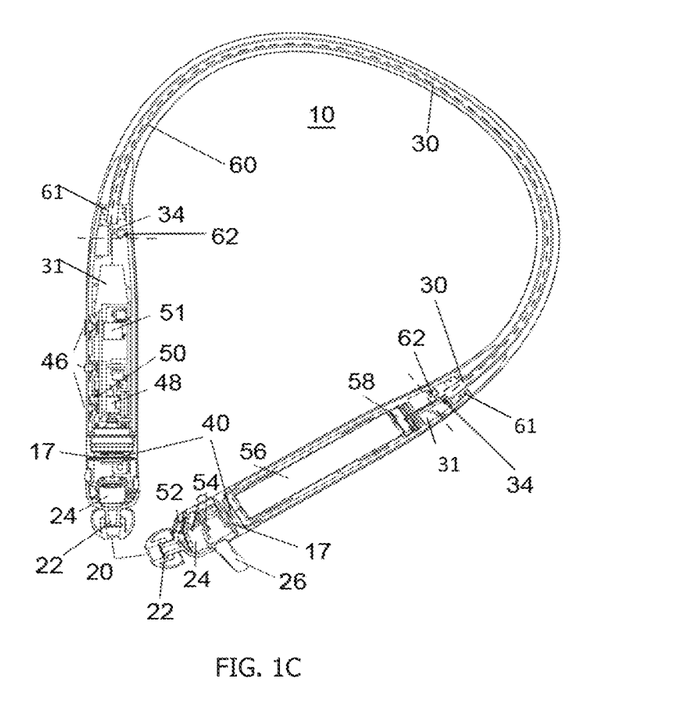
FIG. 1C is a cross sectional view of the present neck collar headset.

Referring now to the drawings, FIGS. 1A-C illustrate one embodiment of such a device which is referred to herein as device 10.

Device 10 is configured as a neck collar-type headset that can interface with a mobile device (MP3 player or a smart phone) or a computer via a wired or a wireless (e.g. BlueTooth) connection. The headset can also be a standalone device with local storage and/or wireless capabilities for interfacing with a cloud storage server or a device combining both standalone and mobile device connectivity features.

Device 10 includes a neck collar 12 having a neck brace 14 attached to or contiguous with a pair of arms 16 (neck brace 14 is a bridge interconnecting arms 16 which start from about the dashed line). Device 10 further includes a pair of earbuds 18 which are connected via wires 19 to electronics contained within neck collar 12. Each of earbuds 18 includes an eartip 20 which is fabricated from a soft elastic material such as silicone and is configured to cover a nozzle 22 of a speaker 24 (FIG. 1C). When not in use (out of ears), earbuds 18 can be docked at ends 17 of arms 16 (as is shown in FIGS. 1A-C). Docking can be effected via a releasable locking mechanism that includes magnets, Velcro fasteners or the like.

Each earbud 18 also includes a stabilizing fin 26 for stabilizing earbud 18 when positioned in an ear of a user. A stabilizing fin 26 design suitable for use with device 10 is described in U.S. Provisional Patent Application No. 62/323,727.

As is shown in FIG. 1C, neck brace 14 portion of neck collar 12 includes an elastic element 30 positioned within a channel in neck brace 14 (element 30 shown by dashed line, channel indicated by 60). Element 30 is configured for:

(i) applying a force biasing arms 16 inward to thereby stabilize neck collar 12 on a neck of a user (FIG. 1A); and (ii) enabling folding of neck collar 12 into a folded configuration with arms 16 crossing each other and neck brace 14 forming more than one complete loop (FIG. 1B).

Element 30 can be a wire fabricated from a tempered high-carbon steel or Nitinol or a polymer such as polyether ether ketone (PEEK), fiberglass or carbon fiber.

The shape of the wire is chosen to ensure comfort when placing the device around the neck. A shape with a small radius arc would produce larger forces than a one with a larger arc. However, if the arc is too large the device might shift and bounce during physical activity and if too small, clamping forces can lead to discomfort. The friction of the external surfaces of device 10 is also a factor, and a surface with a light (max height 0.1 mm) texture is best suited for minimizing frictional discomfort and yet providing grip. Most of the inward biasing force is applied by neck brace 14 to the skin by region 32 (FIG. 1A) of each arm 16 which contacts the skin over an area of 25-35 $cm^2$. In order to ensure that the skin pressure at this interface is below ischemic pressure (30-70 $gm/cm^2$), the force applied by element 30 is selected from a range of 20-60 gm.

An element 30 fabricated from tempered high-carbon steel having a diameter of 0.7 mm and a length of 245 mm, shaped roughly as a horseshoe with an opening gap of 121 mm between ends 34 of element 30 and a curvature radius of 82 mm would produce a clamping force of 30-40 gm.

To further increase stability of device 10, neck collar 12 and optionally arms 16 are covered by a high friction polymer such as high friction silicone or polyurethane, with a light (max height 0.1 mm) texture.

As is mentioned above, element 30 is also configured for enabling a user to fold device 10 for storage. Such folding is important since a neck collar type headset can be bulky and difficult to carry or store when not in use.

As is shown in FIG. 1B, the folded configuration of device 10 (which forms almost 2 complete loops of neck collar 14) has a footprint which is substantially smaller than that of the open configuration (FIG. 1A). In fact, the folded configuration occupies just 28% when compared to the open configuration. This is beneficial for shipping, storage and carrying in a pocket. Furthermore, the folding shape creates a closed loop that can be useful for hanging in a gym locker for instance.

Figure 2:
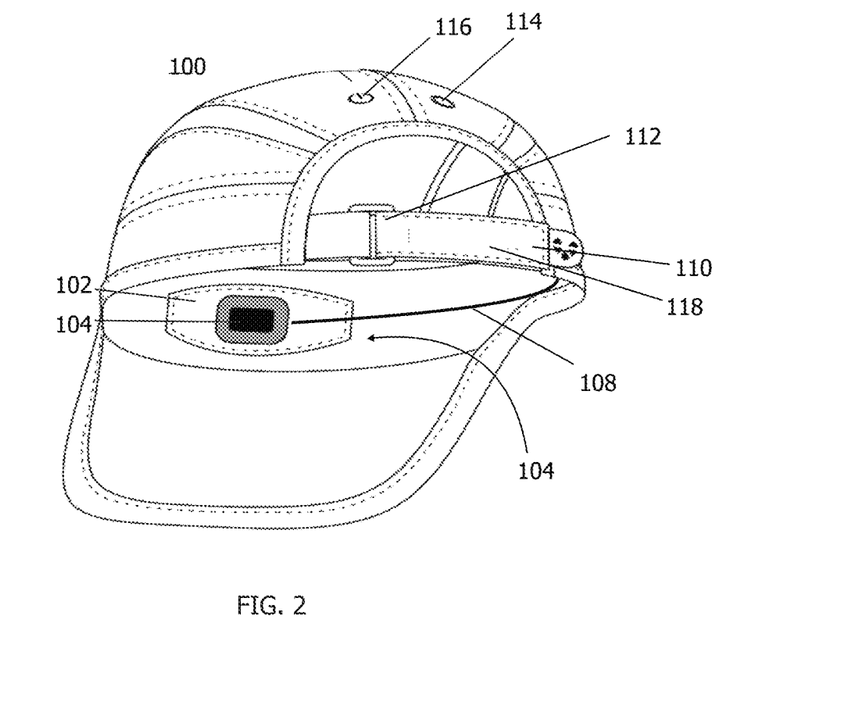
FIG. 2 illustrates a cap having the system of the present invention.

Since element 30 is pre-shaped, elastic arms 16 apply only a slight outward biasing force when device 10 is in the folded configuration—about 270 gram-force (gmf). Thus, in order to further stabilize device 10 in the folded configuration arms 16 can include a mechanism for interlinking arms 16 at a cross over region 36 (FIG. 2). Such a mechanism can include magnets, latches, hooks, Velcro fasteners or the like.

FIG. 1C illustrates the internal components of one embodiment of device 10. Earbuds 18 of both arms 16 include speaker 24 (such as Chia-Ping CEHR-057NWG) having a nozzle 22 covered by silicone eartip 20 and silicone stabilizing fin 26. Each earbud 18 docks with an end 17 of arm 16 via magnets 40 and is wired to electronics inside element 12 via wire 19. A first arm 16 includes interface elements 46 for controlling device 10 a radiofrequency chip 48 for providing communication capabilities (BlueTooth, WiFi, Cellular etc), a barometer 50 for providing ambient pressure (for elevation information) and a micro control unit (MCU) 51 for sensor signal processing. All of these electronic elements are encased in a plastic enclosure 31, which protects the electronics and gives structure to the arm 16. A second arm 16 includes a PPG sensor 52 for obtaining heart rate data from an ear of a user, an accelerometer 54 for obtaining motion data, a Lithium-Polymer battery 56, and a vibration engine 58 for alerting the user to system notifications. The battery 56 vibration engine 58 and the electronics which run it are enclosed in plastic enclosure 31.

Device 10 further includes element 30 which is positioned within a larger cable 60 with both ends 34 bent into recesses 62 at arms 16. This bend ensures the wire 30 supports the structure of neck collar 30 and is anchored in place. Cable 60 relays power and data between arms 16 and is anchored using two strain relief elements 61.

Device 10 can perform high level processing on sensor information, to calculate other parameters by fusing the information from all the sensors with data acquired from the user's past work outs. High level processing will enable an estimation of physiological related parameters, i.e. muscular or cardio fatigue, fitness levels, estimating a user's ability to complete a run in a certain time etc. These high level parameters enable the system to guide the user and help him/her maximize performance. For example, the suggested speed, cadence, and incline a user should run at to maximize a workout and improve. Other information could help the user recover, such as suggested rest time, suggested water intake for re-hydration etc.

Another layer of high-level processing might include training plans. The system can calculate a suggested training plan that is customized for a certain user according to the fitness level the user displayed (or calculated from past data or determined by his first few runs) and other input from the user such as goals (e.g. lose weight, run a marathon, run 5 kilometers), weight, availability etc. Furthermore, the training plan can be updated based on individual progress (reflected in performance and cardiovascular changes), compliance with the plan (complying with instructions, missing runs etc), recovery time, sleep and more.

The high level processing can use location information and weather reports from the internet to suggest the best running tracks for a certain user or correct the planned training length to account for extreme weather, as an example (i.e. high temp/pollution—suggest to run indoors or lower the intensity of the run).

Such high level processing can be performed by device 10 using onboard microprocessors, or on a smartphone app, with the sensor information flowing wirelessly to the phone using Bluetooth and utilizing history data stored on the phone or in the cloud.

During a training session, a user can receive inputs from the sensors and high level processing. This is done either by looking at the screen of the Smartphone, to see the graphic output of the application, or using voice and sound communication (Hands-Eye free). At predefined intervals, during a training session, an application will play a voice prompt indicating the outputs from the sensors and processing, e.g. how much time has passed, the user's heart-rate, speed, and effort zone. The user may also quarry the system for data updates, using his voice. The user can use any of a list of commands to get the information he requires ('Heart-rate!', 'Timer!') or perform actions ('Volume Up!', 'Next track!').

FIG. 2 illustrates a smart running cap which is referred to herein as device 100. Device 100 includes an optical HR sensor 102 which is mounted on an elastic band 102 attached (e.g. stitched, welded or bonded) to a front inner surface 106 of device 10. HR sensor 104 is positioned such that the sensor face comes into contact with the use's forehead when the cap is worn on the head.

Elastic band 102 can be fabricated from a fabric such as polyester and serves to stabilize HR sensor 104 against the user's forehead in order to obtain clean (high SNR) signals during physical activities. Data from HR sensor 102 is routed via a wire 108 to processing unit 110 which is positioned at rear buckle 112 of device 100. Both wire 108 and processing unit 110 are sown into the cap. The user can control operation via button 114 and receive feedback (status etc) via multicolored LED 116.

Device 100 further includes an accelerometer 118 which can be co-housed with processing unit 110.

HR sensor 104 provides hear rate data while data from accelerometer 118 is utilized to provide indoor running/walking speed in the manner described hereinabove.

Device 100 can further include the sensors and components described above for device 10, including one or more earbuds.

As used herein the term "about" refers to ±10%.

Additional objects, advantages, and novel features of the present invention will become apparent to one ordinarily skilled in the art upon examination of the following examples, which are not intended to be limiting.

EXAMPLES

Reference is now made to the following example, which together with the above descriptions, illustrate the invention in a non limiting fashion.

Estimating Indoor Running Speed Using a Head-Mounted Motion Sensor

In order to derive indoor speed estimation from motion data, test subjects were fitted with a MEMs motion sensor and were instructed to run at various speeds on an indoor treadmill.

Running on a treadmill does not produce significant horizontal speed data since the speed of the subject relative to the ground is zero. While a foot pod can be used to integrate over acceleration (of the foot) to provide relative speed, measuring acceleration from upper body (e.g. head) presents a bigger challenge since there is no direct physical attribute that can be correlated to the relative speed of the subject with respect to the treadmill.

Model Construction and Calibration

Testing indicated that motion sensor data derived from a head-mounted MEMS sensor includes features that can be accurately correlated with changes in speed.

Figure 3:
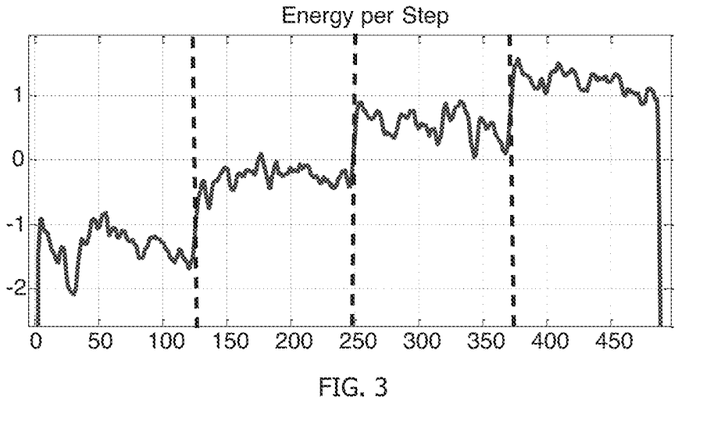
FIG. 3 is a graph illustrating trait change over different running speeds.

FIG. 3 is a graph illustrating features derived from the motion sensor data at four different speeds (sectors divided by dashed line).

As can be seen from this graph, features corresponding to locomotion are not readily visible. While the data derived from an acceleration MEMS sensor of a (foot pod) pedometer can be easily parsed to provide forward speed (even on a treadmill) due to the fact that pedometers can detect 'zero speed' at the moment when a foot touches the ground, the data derived from acceleration sensors mounted on the upper body (torso or head), do not present such features since at constant speed the upper body does not experience significant or repetitive horizontal acceleration.

Thus, in order to extract meaningful features from upper body-mounted acceleration sensors, the present inventors constructed a probabilistic model that can be used to estimate running speed based on upper body acceleration features.

The model was constructed using a classical machine learning (ML) approach. Two main machine learning approaches can be used for supervised learning: regression and classification.

Regression—The algorithm learns parameters which best fit the calculated features to the labeled data (speed). Given new features, the ML engine uses pre learned parameters to estimate the current speed.

Classification—The algorithm learns to recognize each of the pre supplied labels during calibration, classification is effected using a limited fixed set of predefined values.

Modeling can incorporate both approaches in order to allow continuous update of regression parameters.

A general simplified model is constructed by collecting acceleration data from a plurality of subjects and correlating features extracted from the data with various running/walking speeds of different users.

Once the general model is constructed, a calibration step can be used to collect labeled data for each individual (or similar groups of individuals) by asking the individual to run for a few minutes at several known velocities typical for his/her activity.

The ML identifies and learns user-specific parameters which can then be used to match known features derived from acceleration data to various speeds (supervised learning). In other words, speeds derived from acceleration data features (using the general model) can be corrected per individual based on the user-specific parameters uncovered in the calibration stage.

Since the running/walking form of an individual can change over time, the calibration parameters for each individual can be updated offline using an update engine (e.g. cloud server). Some user feedback might be needed to perform the update (for example, the system can ask the user if he ran at X speed).

Data Collection

Five test subjects participated in 24 labeled experiments, each experiment included four different running speeds at 2 minute intervals. The data was split into train, validation and test sets to determine performance.

The subjects were fitted with earphones having an ADXL345 accelerometer (Analog devices Inc.) and the output of the accelerometer was recorded for each subject at different speeds at 3 minute intervals. The treadmill speed was recorded along with the accelerometer output and was used for validation of results.

Figure 4A:
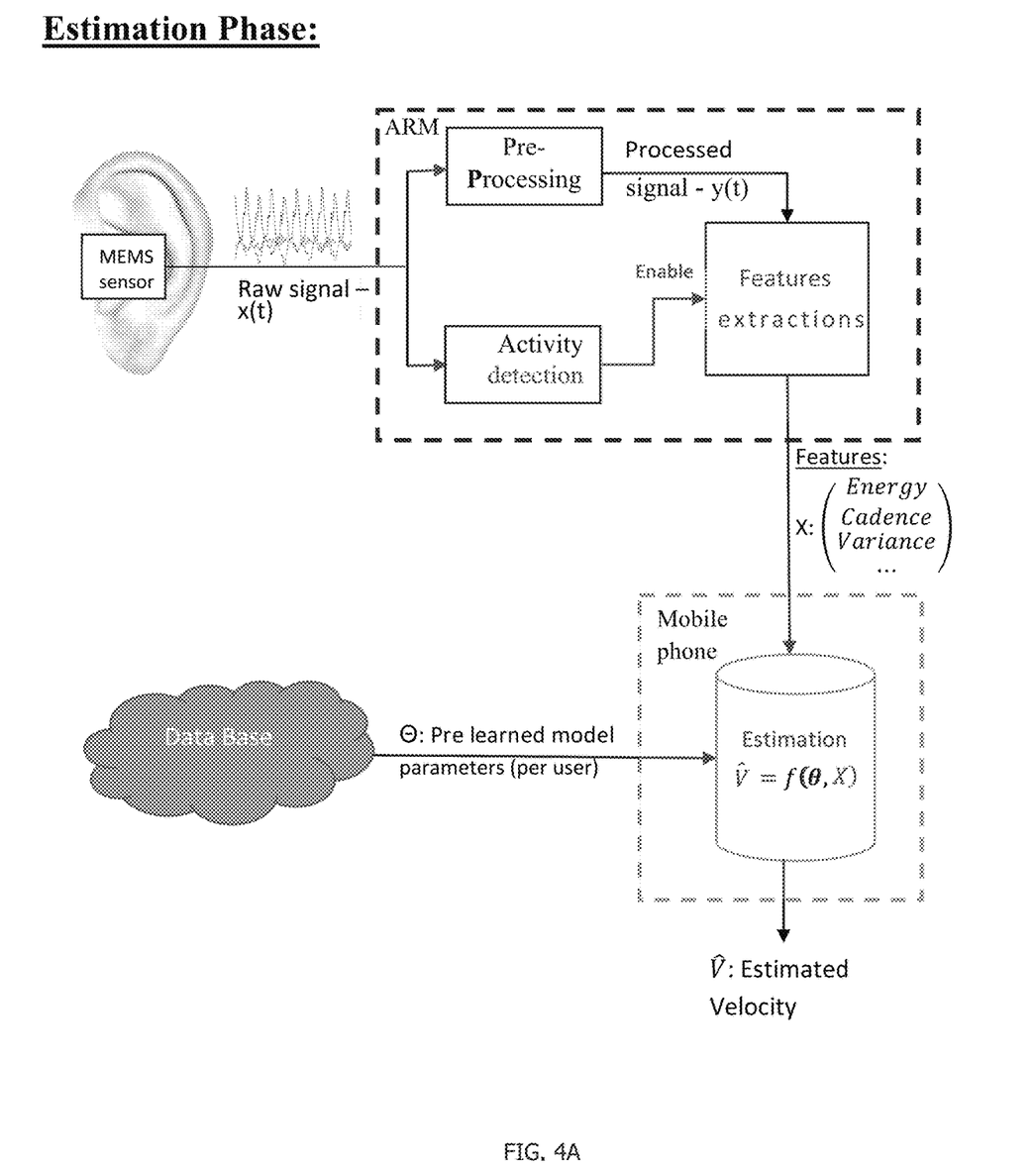
FIGS. 4A-B illustrate the present approach of deriving speed data from a head mounted motion sensor.
Figure 4B:
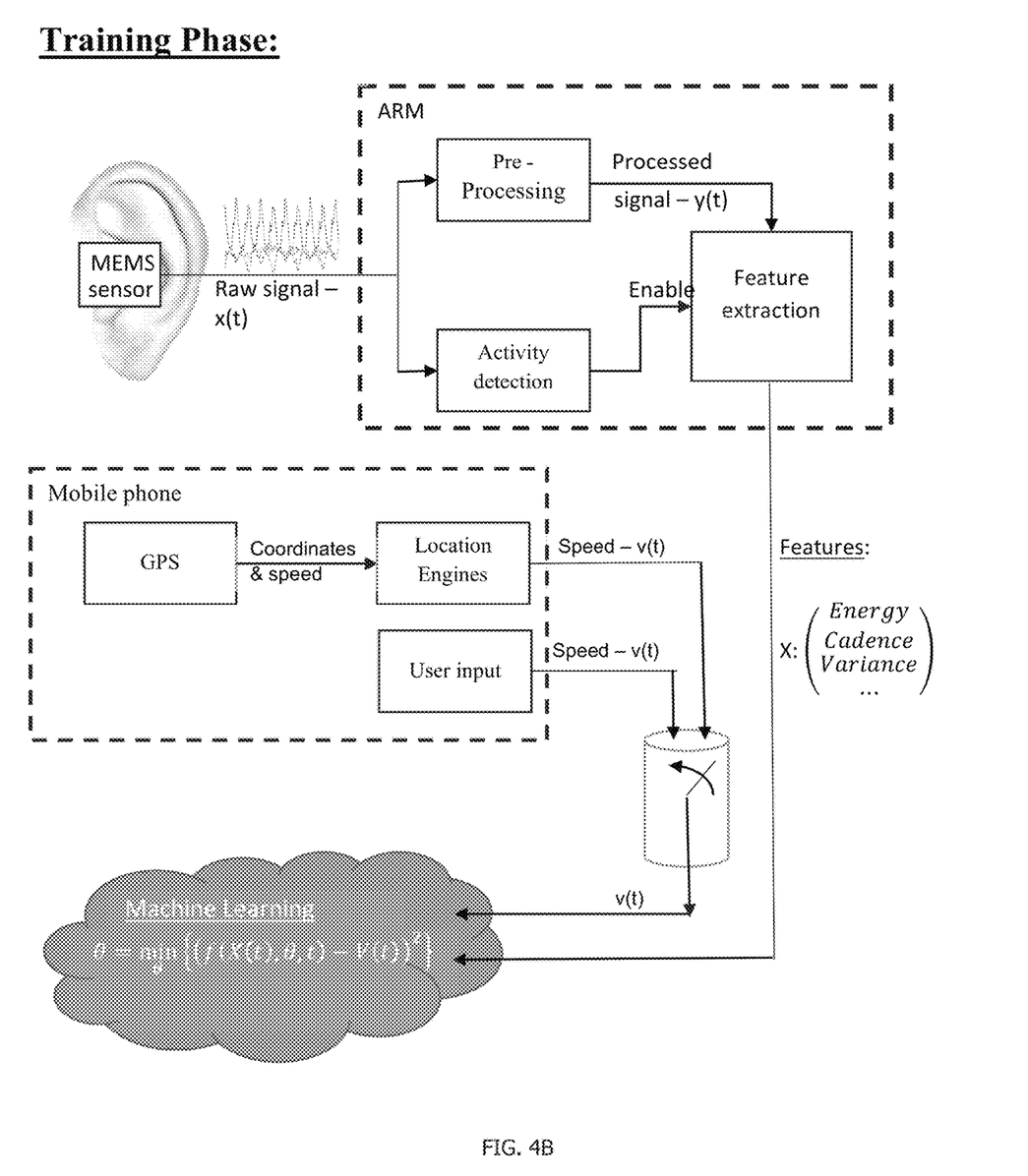
Figure 5A:
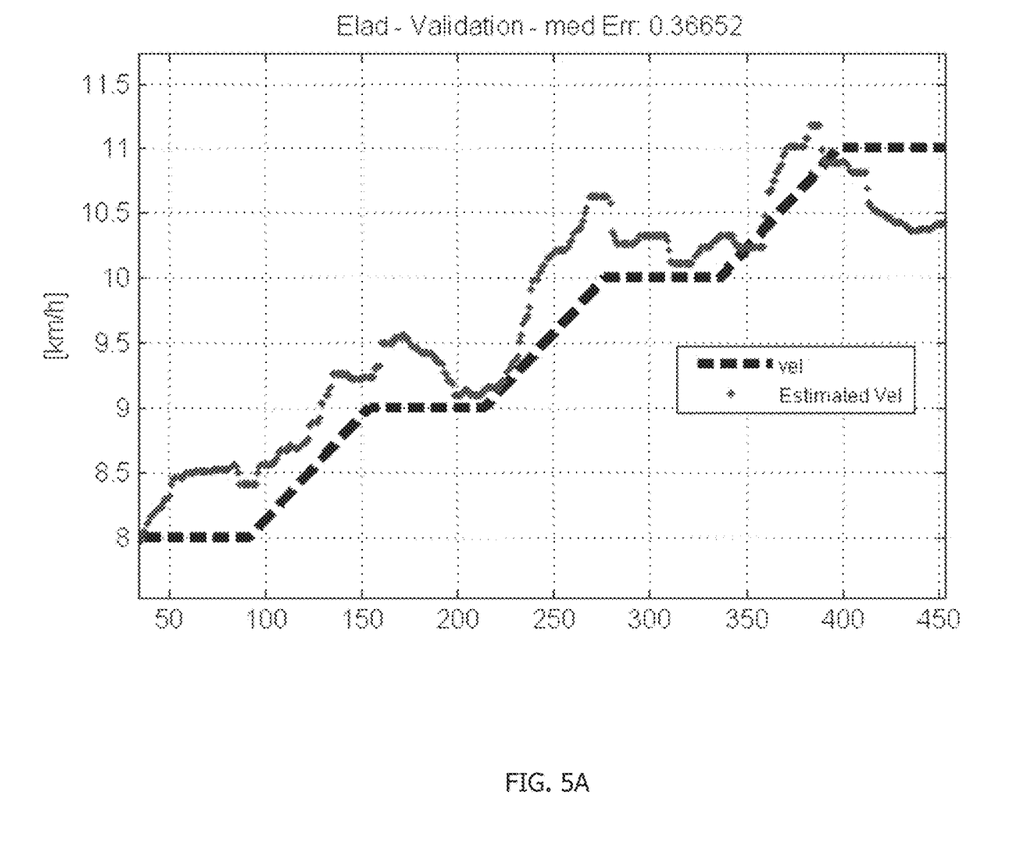
FIGS. 5A-E are graphs illustrating speed estimation using the present approach on four test subjects.
Figure 5B:
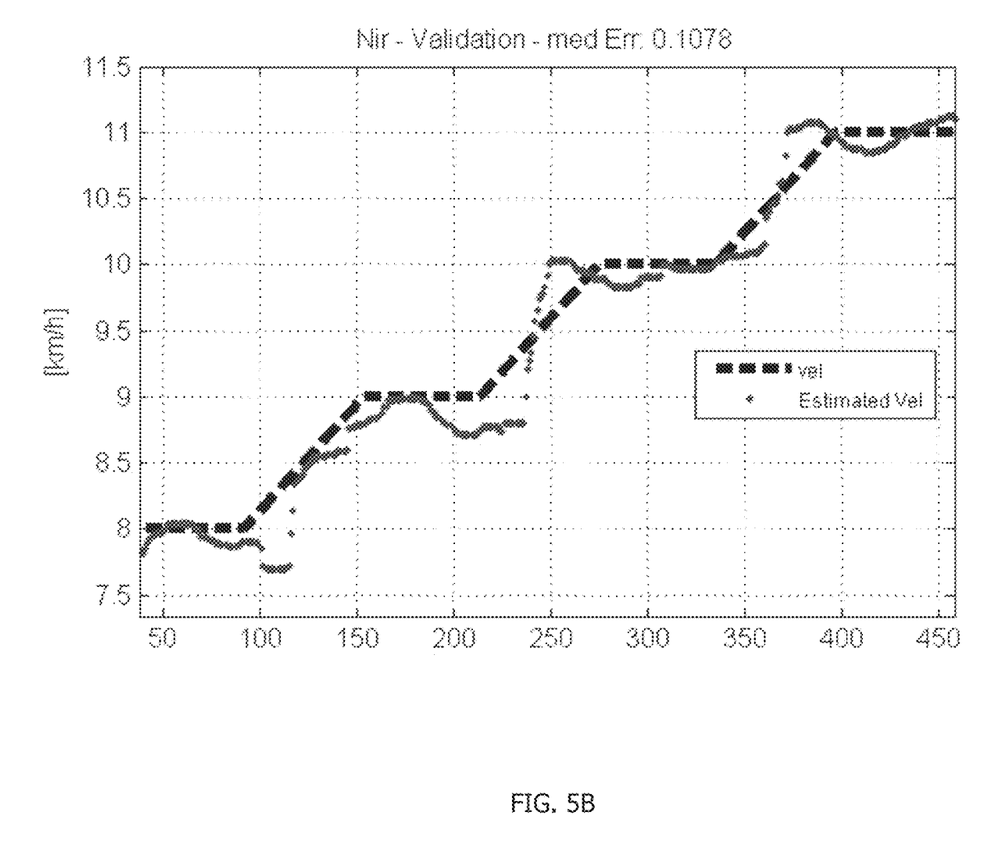
Figure 5C:
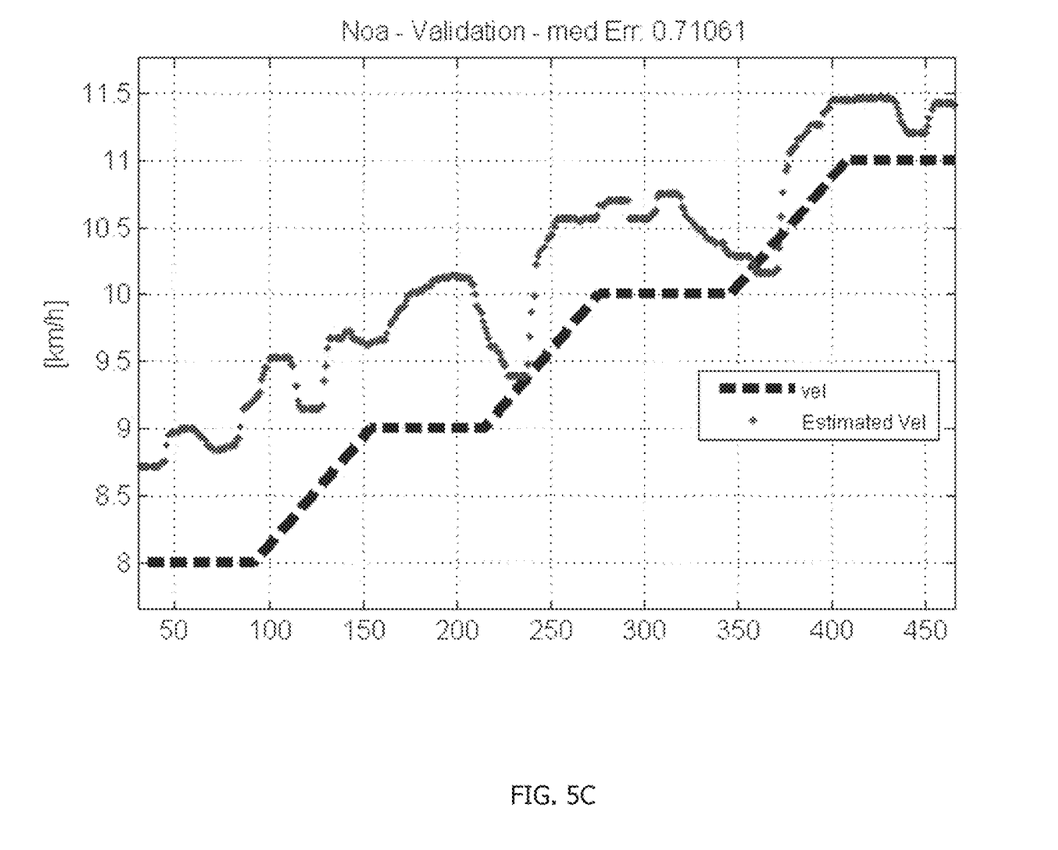
Figure 5D:
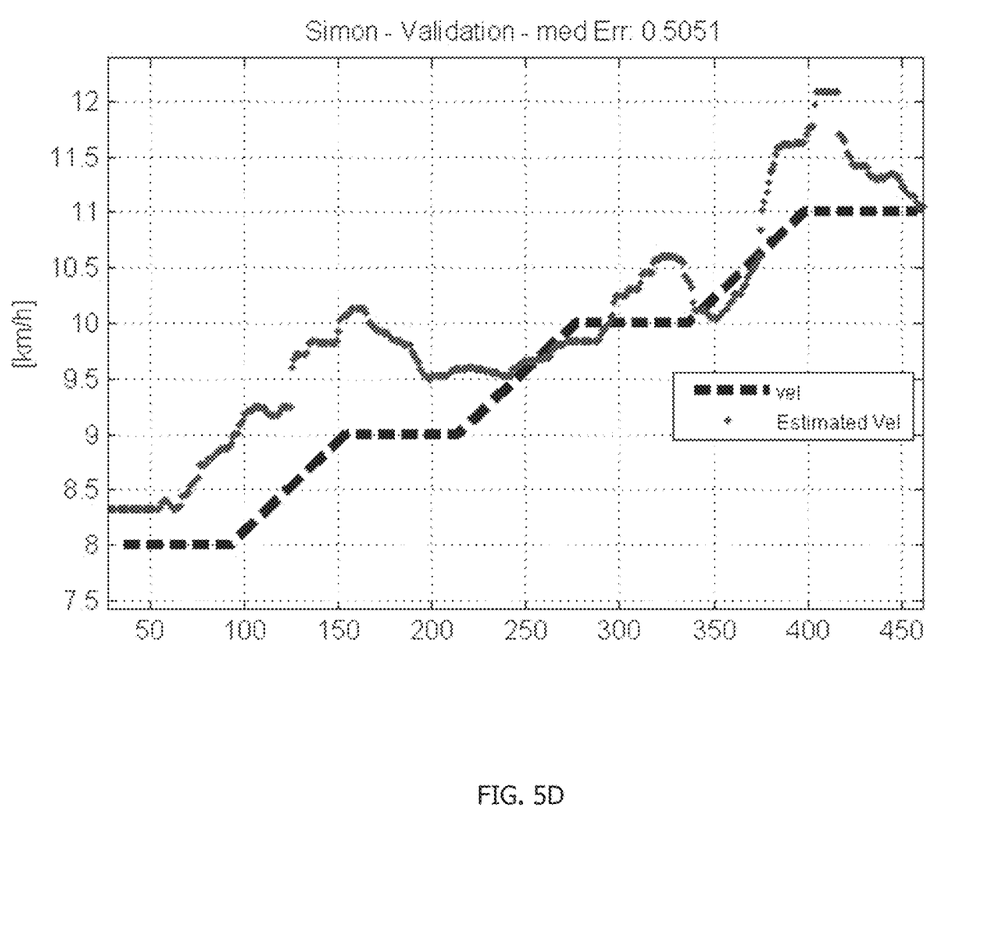
Figure 5E:
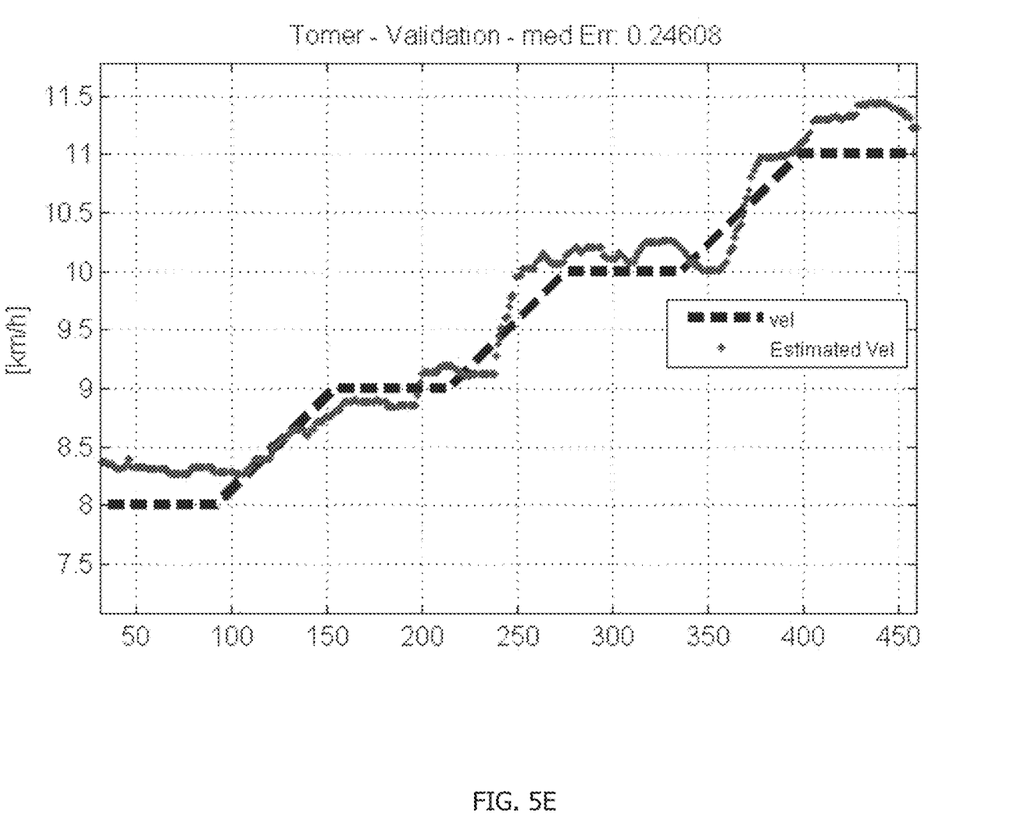

FIGS. 4A-B illustrates the process of data collection and processing used to provide indoor speed estimation.

Pre Processing—preparing the raw accelerometer signal for feature extraction.

Activity Detection—identifying when a user is running/walking according to accelerometer statistics.

Location Engine—Generating a precise speed estimation out of the GPS speed and location outputs (sensor fusion)

User Input—user provides speed information or complies with speed instructions.

Feature Extraction—calculating a vector of features out of raw accelerometer data.

Machine Learning—calculating parameters which best fit the user running speed out of extracted features. For example, finding the linear regression coefficients that best fit the features to the speed (in the Minimum Mean Square Error sense).

Estimation—using machine learning parameters to estimate the user speed.

Results

FIGS. 5A-E present the results for the five test subjects. The actual user speed is shown by the dashed line (8,9,10 & 11 km/h), while speed estimation using the present approach is shown by a solid line. These results are taken from the test set which means the acceleration sensor data was not provided to the system for prior processing and calibration and thus simulates expected 'field' results.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A system for estimating an indoor speed of an individual comprising:
    (a) a motion sensor attachable to an upper body of the individual;
    (b) at least one processor being in communication with said motion sensor, said processor being configured for:
        (i) periodically prompting said user to provide a speed value or instructing said user to run/walk at a specific speed value;
        (ii) extracting features from data collected by said motion sensor that correspond to said speed value;
        (iii) calculating a speed of the individual from a probabilistic model constructed from (i) and (ii).

2. The system of claim 1, wherein said motion sensor is integrated into an earbud of a headset.

3. The system of claim 1, wherein said processor is integrated into an earbud or neck collar of said headset.

4. The system of claim 1, wherein the system includes two processors, a first processor for providing (ii) and a second processor for providing (iii).

5. The system of claim 2, wherein said second processor is remote from said motion sensor and communicates therewith via wireless communication.

6. The system of claim 2, wherein said motion sensor is integrated into an earbud or neck collar of a headset and said second processor is part of a cloud server.

7. The system of claim 1, wherein said probabilistic model is constructed from classification or regression analysis.

8. The system of claim 1, wherein said features extracted from said data collected by said motion sensor are acceleration features.

9. The system of claim 1, further configured for automatically detecting when the individual is indoors.

10. The system of claim 1, wherein said processor classifies (iii) with respect to a GPS-determined speed when the individual is outdoors.

11. The system of claim 1, wherein said model takes into account biometrics of said individual.

* * * * *